March 19, 1968  E. A. MEYER  3,374,017
RETAINER ASSEMBLY
Filed March 31, 1966
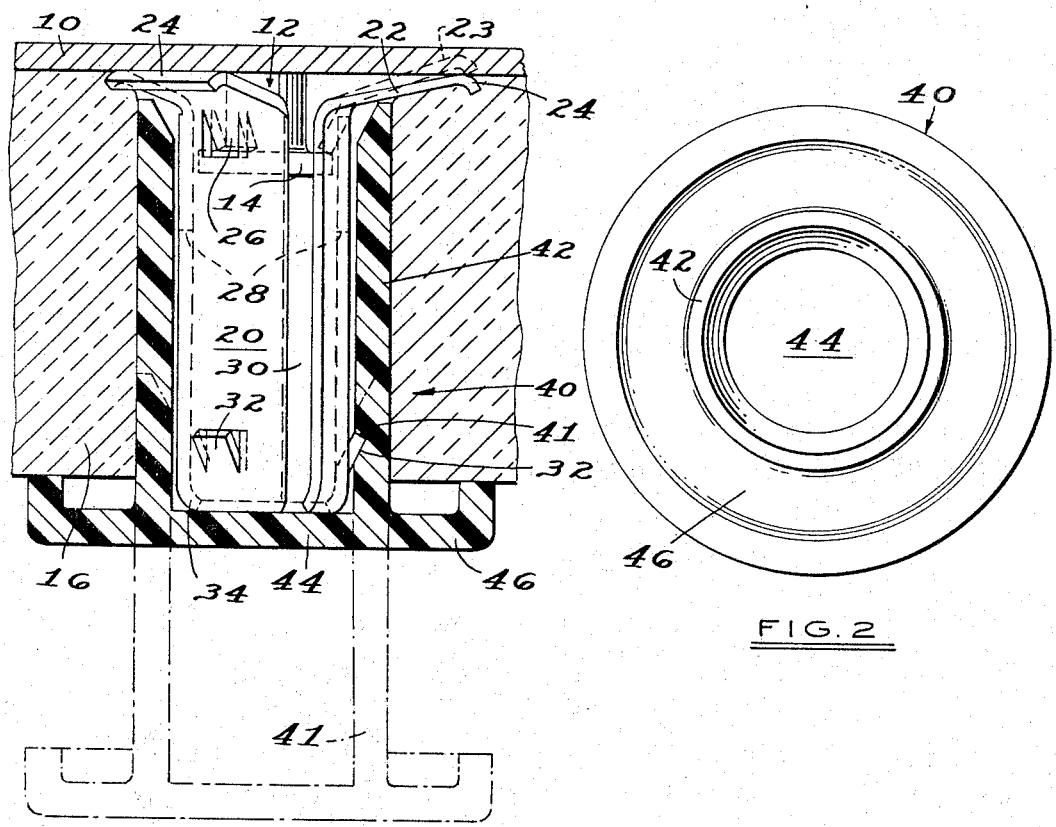
FIG. 1
FIG. 2
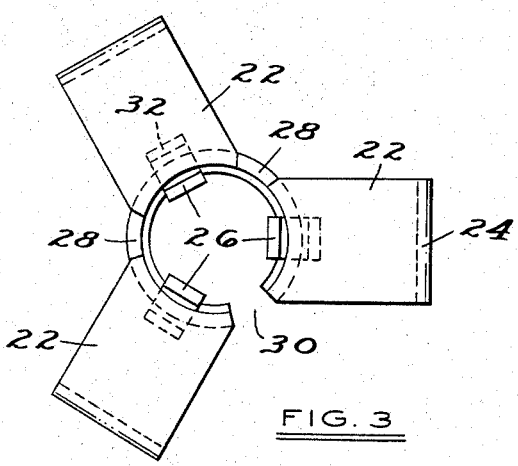
FIG. 3
INVENTOR
ENGELBERT A. MEYER
BY
Burton & Parker
ATTORNEYS United States Patent Office 3,374,017
Patented Mar. 19, 1968

3,374,017
RETAINER ASSEMBLY
Engelbert A. Meyer, Union Lake, Mich., assignor to Warren Fastener Corporation, Mount Clemens, Mich., a corporation of Michigan
Filed Mar. 31, 1966, Ser. No. 539,127
7 Claims. (Cl. 287—189.35)

ABSTRACT OF THE DISCLOSURE

This disclosure relates to a retainer assembly adapted to secure a structural member to a support, including a headed button secured to the support, a metal clip secured beneath the button head having downwardly facing locking spurs, and a retainer formed of a material softer than the clip spurs telescopically received over the clip and deformably retained thereon by the spurs.

---

Insulation, in panel form, is employed in automotive manufacture in such applications as heat and sound attenuation behind the dash panel and beneath the hood. The retainer of this invention can, however, be used to retain other articles to a support. For example, the retainer might be used to connect panels together, or to retain insulation in other fields of manufacture, such as electrical equipment or appliances.

Preferably, the button of this assembly is attached to the support in accordance with the method described in my United States Letters Patent No. 3,153,468, wherein the button is welded to steel or adhesively secured to various materials including steel, thereby eliminating the corrosion problem inherent in previously used techniques requiring a hole through the support. A series of spaced buttons in combination with the retainer of this invention may be employed to secure an insulation panel.

A suitable size of button, presently used in automotive manufacture, involves a button which is 0.200 inch in diameter at its head and 0.160 inch in height; the shank of the button being slightly greater than one-half the diameter of the head. Utilization of this concept of attachment in the automotive field has already provided substantial economies in trim attachment. Similar economies and advantages are obtained in other fields, such as appliance manufacture and the like.

The instant invention will be described in the context of an insulation attachment in automotive manufacture.

Previously known insulator attachment assemblies require different adapters for the various thicknesses of insulation to be attached to the automotive panel. Further, the retainer assembly required an aperture in the panel, which conducted sound or heat through the panel. Insulator attachment is especially troublesome in areas where an aperture cannot be provided in the supporting panel, such as is the case in insulation attachment beneath the hood. Presently, insulation is secured to the underside of an automotive hood by adhesive bonding or the like, which is inadequate and expensive.

Summary of the invention

The retainer assembly of my invention includes a button having a laterally extending head portion secured to the support in overlying relation, a metal clip secured beneath the button head in overlying relation having generally downwardly facing locking spurs, and a retainer means formed of a material softer than the clip means locking spurs. The retainer is telescopically received over the clip means and deformably retained thereon by the locking spurs, thereby permitting adjustment of the retainer toward the support, and restraining withdrawal therefrom. The retainer means has a head portion extending laterally outwardly from the telescopic portion, overlying the support, adapted to retain an article or structural member received between the head portion and the support. In the preferred embodiment, the clip means has generally upwardly extending locking fingers tensioned beneath the head of the button, and generally downwardly extending arms resiliently tensioned against the support.

The retainer assembly disclosed herein has a metallic clip means which is secured to a button previously connected to the supporting panel. The clip means is provided with generally downwardly extending gripping elements which retain a thermoplastic retainer element telescopically received over the clip means. The retainer has a head portion which overlies the support and retains the insulation against the support. The clip means unidirectionally restrains the retainer against withdrawal, but permits telescopic adjustment of the retainer toward the panel to accommodate various thicknesses of insulation. Thus, the retainer assembly of this invention eliminates the requirement of an aperture through the panel to retain the insulation, and provides a single retainer assembly for the various insulation thicknesses.

Other objects, advantages, and meritorious features of this invention will more fully appear from the following specification, claims, and accompanying drawings, wherein:

FIG. 1 is a partially cross-sectional side view of the retainer assembly of this invention;

FIG. 2 is a bottom view of the retainer means; and

FIG. 3 is a bottom view of the clip means shown in FIG. 1.

Referring now to the specific embodiments shown in the drawings, wherein the retainer assembly is shown in FIG. 1. The support to which the insulation 16 is to be secured is indicated at 10. A button 12, which has been described hereinabove, is secured to the support as by welding. A clip, indicated generally at 20 and shown in FIG. 3, is connected to the button beneath the button head 14. And, a retainer, indicated generally at 40 and shown in FIG. 2, is telescopically received over the clip and adjustably connected thereto.

The clip 20 of this embodiment of my invention may be formed from a single sheet metal blank. The base portion of the clip is provided with generally downwardly extending arms 22, which are tensioned against the support 10. The support in this description will be taken as the reference, and "downwardly" therefore refers to the direction toward the support. The ends 24 of the arms may be turned upwardly to prevent galling when the arms are tensioned against the support. A plurality of locking elements or fingers 26 are struck inwardly from the body portion of the clip, and are received beneath the head 14 of the button.

The clip is attached to the button by telescoping the base portion over the button, and forcing the clip toward the support; which may be accomplished by impacting the forward portion of the clip 34. This will flex the arms, as shown in phantom at 23, and the locking elements 26 will "snap" beneath the button head. The resiliency of the arms, and thereby the tension of the clip against the support, may be controlled by varying the length of the slots 28, which define the arms therebetween. Because the clip of this embodiment of my invention is formed from a sheet metal blank, one slot 30, which is defined by the sides of the blank, will extend the length of the clip.

The forward portion of the clip is provided with generally downwardly extending gripping elements 32, which may be struck outwardly from the clip body. The gripping elements 32 define an acute angle with the axis of the clip, and the forward nose portion of the clip 34 has been turned inwardly to permit telecsopic receipt of the retainer 40.

The retainer 40 has a body portion 42 which is telescopically received over the body portion of the clip, and a head portion 44. The head portion 44 of the retainer is provided with a peripheral flange 46, which overlies the support 10, and retains the insulation 16 thereagainst.

The retainer is preferably made of a deformable material, such as a plastic, to allow the gripping elements 32 of the clip to secure the adapter, as shown at 41. A suitable material for this purpose is polyethylene, however other materials may be used.

It can be seen from FIG. 1 that the retainer assembly of this embodiment of my invention permits telescopic adjustment of the retainer 40 to accommodate various insulation thicknessses. The gripping elements 32 of the clip unidirectionally restrains the retainer 40 against withdrawal, but permits telescopic adjustment of the peripheral flange 46 toward the support 10. The retainer is shown in phantom at 41 to illustrate the capacity of this adjustment.

What is claimed is:

1. A retainer assembly, comprising: a support having a button attached thereto, said button having a laterally extending head portion overlying said support, a metal clip means secured beneath said button head portion in overlying relation having generally downwardly facing locking spurs, and a retainer means telescopically received over said clip means formed of a material softer than said locking spurs and deformably retained thereon by said locking spurs thereby permitting adjustment of said retainer toward said support and restraining withdrawal therefrom, said retainer means having a head portion extending laterally outwardly from the telescopic portion overlying said support and adapted to retain an article received between said head portion and said support.

2. The retainer assembly defined in claim 1, characterized in that said clip means is tensioned against said support.

3. The retainer assembly defined in claim 1, characterized in that said clip means has generally upwardly extending locking fingers tensioned beneath the head of said button, and generally downwardly extending arms resiliently tensioned against said support.

4. The retainer assembly defined in claim 1, characterized in that said deformable retainer means is formed from a thermoplastic material, and said clip means is metallic.

5. An insulator assembly, comprising: a support having a headed button attached thereto, said button having a laterally extending head portion overlying said support, a layer of insulation overlying said support having an aperture in communication with said button, a clip means secured beneath said button head portion disposed within said insulation aperture having downwardly facing locking spurs, and a retainer having a head portion overlying said insulation and a body portion telescopically received over said clip means and deformably retained thereon by said locking spurs permitting telescopic adjustment of said retainer toward said insulation while preventing withdrawal therefrom.

6. A retainer for attaching a layer of insulation in overlying relation to a support having an outer surface with a headed button attached thereto, comprising: a clip means, and a retainer means, said clip means having a base portion adapted to be connected to a button attached to a support and a body portion, said base portion having a plurality of generally downwardly extending arms defining an acute angle with the axis of said body portion and locking elements inwardly struck from said clip means adapted to be received beneath the button head, said body portion having downwardly facing locking spurs said adapter means having a body portion telescopically received over the body portion of said clip means and deformably retained thereon by said locking spurs and a head portion having a downwardly facing surface extending laterally from said body portion adapted to retain a layer of insulation received between said surface and a support.

7. The retainer defined in claim 6, characterized in that said retainer means is formed of a thermoplastic material.

References Cited

UNITED STATES PATENTS

| | | | |
|---|---|---|---|
| Re. 22,544 | 9/1944 | Tinnerman | 25—84 |
| 2,430,543 | 11/1947 | Tinnerman | 25—84 |
| 3,230,592 | 1/1966 | Hosea | 52—509 |

FOREIGN PATENTS

| | | |
|---|---|---|
| 178,185 | 4/1954 | Austria. |

EDWARD C. ALLEN, *Primary Examiner.*

W. L. SHEDD, *Assistant Examiner.*